United States Patent
Libbey, IV et al.

(10) Patent No.: US 7,428,579 B2
(45) Date of Patent: Sep. 23, 2008

(54) METHOD AND SYSTEM FOR SEGMENTATION OF A MESSAGE INBOX

(75) Inventors: Miles Augustus Libbey, IV, Mountain View, CA (US); Brooke Anne Thompson, San Francisco, CA (US); Sidarth Khoshoo, Mountain View, CA (US); Jeffrey Charles Williams, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 895 days.

(21) Appl. No.: 10/856,007

(22) Filed: May 27, 2004

(65) Prior Publication Data
US 2006/0031313 A1 Feb. 9, 2006

(51) Int. Cl.
*G06F 15/16* (2006.01)
(52) U.S. Cl. ............... 709/206; 709/204; 709/206
(58) Field of Classification Search ......... 709/204, 709/206
See application file for complete search history.

(56) References Cited

U.S. PATENT DOCUMENTS 7,096,498 B2 * 8/2006 Judge ..................... 726/22
2004/0015554 A1 * 1/2004 Wilson ................... 709/206
2004/0058673 A1 * 3/2004 Irlam et al. ............. 455/412.1
2004/0167968 A1 * 8/2004 Wilson et al. ........... 709/207
2004/0203589 A1 * 10/2004 Wang et al. ............. 455/410
2005/0198171 A1 9/2005 Landsman et al.
2005/0246420 A1 11/2005 Little

* cited by examiner

*Primary Examiner*—Jason Cardone
*Assistant Examiner*—Minh-Chau Nguyen
(74) *Attorney, Agent, or Firm*—Darby & Darby P.C.; Jamie L. Wiegand (57) ABSTRACT

A method, apparatus, and system are directed towards managing unsolicited email messages, and the like, in part, by providing segmentation of an email inbox. In one embodiment, the email inbox is segmented into segments associated with a message from a trusted, trusted email address, an untrusted email address, and a segment for a bulk email message, such as spam, and the like. A determination that the message is from a trusted email address may be made based, in part, on whether the email address is associated with one's address book, a degree of separation that may be determined based on an association with another's address book, whether the email address was a sent email address, and the like. By segmenting the email inbox, the invention minimizes a risk associated with incorrectly discarding a message from a desired, but untrusted source.

21 Claims, 4 Drawing Sheets

METHOD AND SYSTEM FOR SEGMENTATION OF A MESSAGE INBOX

FIELD OF THE INVENTION

The present invention relates generally to messaging systems and more particularly to managing unsolicited messages by segmentation of an email inbox.

BACKGROUND OF THE INVENTION

Today, unsolicited messages (spam) have become a wide spread problem, not only for mail service providers, but for the recipient as well. It not only wastes a mail service provider's resources to store large amounts of spam message data, but greatly inconveniences the recipient. How well a mail service provider detects unsolicited messages and manages those messages has become a key component to the quality of service and ultimately to the success of the mail service provider.

Many of today's mail service providers are configured to examine the content of the message, or the like. Then, based on the content, the mail service provider may reject delivery of the message to the identified recipient. Although such actions may save storage space for the mail service provider, it may also result in rejecting a message that the recipient actually did wish to receive. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on."0 Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

Briefly stated, the present invention is directed towards managing a received email message, and the like, in part, by providing segmentation of an email inbox. In one embodiment, the email inbox is segmented into a segment associated with a message from a trusted email address. Another segment is associated with another message from an untrusted email address. Yet another segment of the email inbox is associated with a bulk email message, such as spam, and the like. Segmentation of the email inbox may be achieved employing any of a variety of mechanisms. In one embodiment, segmentation is achieved by associating a special designator with an appropriate email message. The special designator may include, but is not limited to, an icon, a color, a special character, priority parameter, sort parameter, filter parameter, label, and the like. The special designator may be further employed to order messages within the email inbox, filter the messages, forward messages to a predetermined folder, and the like.

A determination that the message is from a trusted email address may be made based, in part, on whether the email address is associated with one's address book, a degree of separation that may be determined based on an association with another's address book, whether the email address is associated with a sent email address, whether the email address is associated with a predetermined site, such as a community message board, chat room, and the like. By segmenting the email inbox, the invention minimizes a risk associated with incorrectly discarding a message from a desired, but untrusted email address source.

Illustrative Operating Environment

Figure 1:
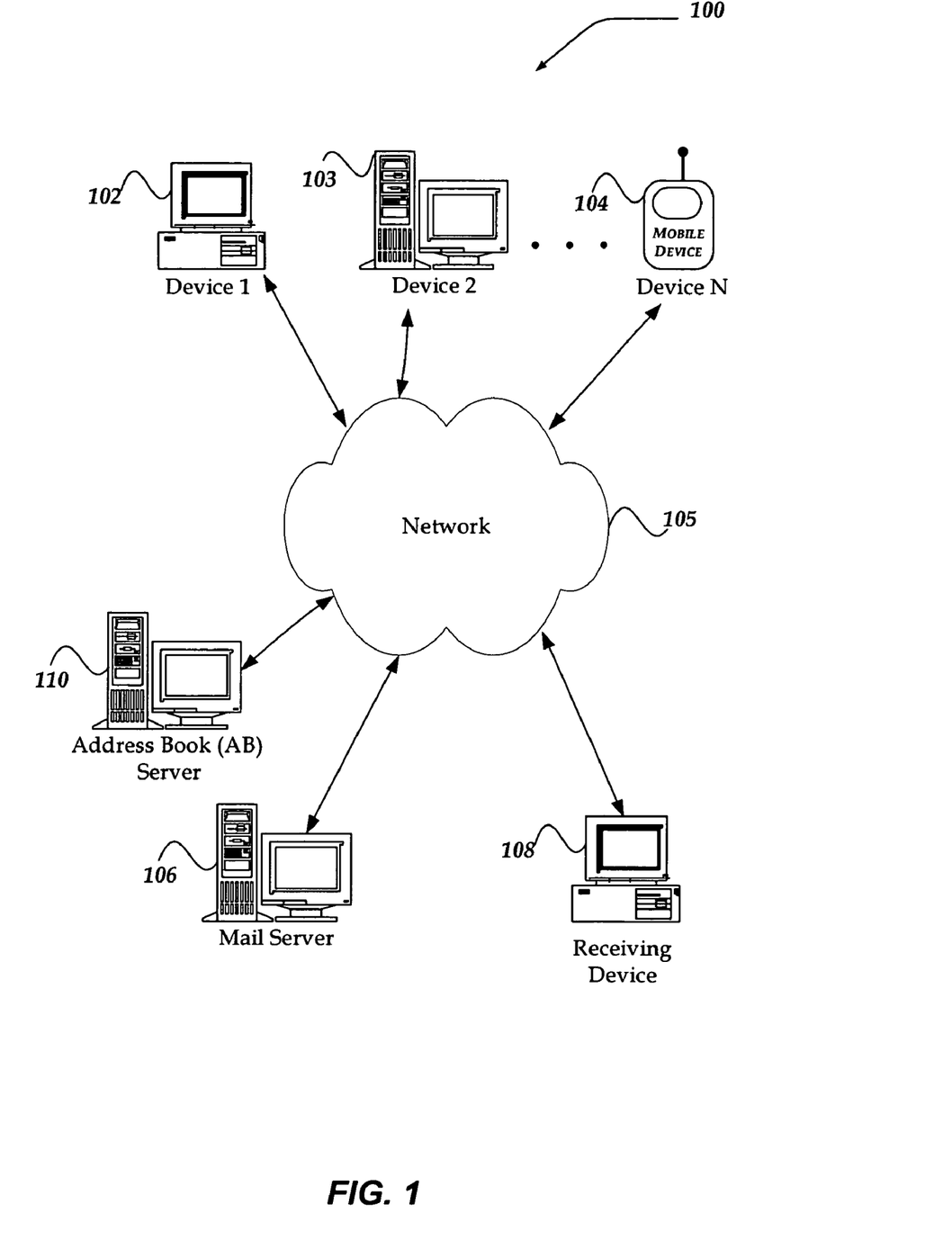
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes devices 102-104, network 105, mail server 106, receiving device (RD) 108, and address book (AB) server 110. Network 105 is in communication with and enables communication between each of devices 102-104, mail server 106, AB server 110, and RD 108.

Devices 102-104 may include virtually any computing device capable of receiving and sending a packet over a network, such as network 105, to and from another computing device, such as mail server 106 and RD 108. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, devices 102-104 may be any device that is capable of connecting using a wired or wireless communication medium such as a PDA, POCKET PC, wearable computer, and any other device that is equipped to communicate over a wired and/or wireless communication medium.

In one embodiment, at least one device within devices 102-104 is configured to operate as a website, a File System, a File Transfer Protocol (FTP) server, another mail server, a Network News Transfer Protocol (NNTP) server, message board server, chat room server, and the like.

In another embodiment, at least one device in devices 102-104 may employ a list of email addresses to send messages to members of the list. The messages may include solicitations, news, advertisements, spam, and the like. Membership on the list may have been sought by a member on the list, in which instance a message to this member may be said to be from a trusted email address. Another member on the list may also be on the list without that member's knowledge, consent, or the like. In that instance, a message to that member might be considered to be from an untrusted email address.

Devices 102-104 may also operate as a personal computing device enabled to send and receive email messages. For example, device 102 may be a personal computer that enables a friend, associate, family member, business, organization, and the like, to send and receive email to RD 108. As such, devices 102-104 may include a mail transfer agent (MTA), such as sendmail, and the like. Devices 102-104 may also include a mail user agent (MUA) such as Elm, Pine, MH, Outlook, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between devices 102-104, mail server 106, AB 110, and RD 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of mail server 106 is described in more detail below in conjunction with FIG. 2. Briefly, however, mail server 106 may include any computing device capable of connecting to RD 108, to manage an electronic mail (email) service for RD 108. Mail server 106 may thus include a message transfer manager to communicate a message employing any of a variety of email protocols, including, but not limited, to Simple Mail Transfer Protocol (SMTP), Post Office Protocol (POP), Internet Message Access Protocol (IMAP), NNTP, and the like.

Devices that may operate as mail server 106 include personal computers desktop computers, multiprocessor systems, microprocessor-based or programmable consumer electronics, network PCs, servers, and the like.

Mail server 106 may further include databases, files, and the like, that are arranged to store a received email message until accessed by a computing device, such as RD 108. Mail server 106 may further include a program that enable examination of the email message, based, in part, on any of a variety of characteristics, including an email address source, destination, and the like, associated with the email message. Mail server 106 may manage email messages for another computing device in addition to RD 108.

Mail server 106 may be configured to request a linking of information associated with address books from AB 110. Linking of address books may include, but is not limited to, receiving information associated with several address books and storing the received information in a linked address book store (not shown). The linked address book store may be employed by mail server 106 to determine a degree of separation between an email message recipient and information associated with another's address book. The linked address book may for example, enable a determination of a friend of a friend, and the like.

For example, mail server 106 may include in its linked address book store, address books associated with Mike, John, and Mary. Associated with Mary's address book, may be an email address for Ted. John's address book may include Mary's email address, and Mike's address book may include John's email address. Mail server 106 may then employ the linked address books to determine that Ted is three degrees of separation from Mike. In one embodiment, mail server 106 may be configured to determine a trust level based, in part, on the determined degrees of separation.

Mail server 106 may also be configured to determine another level of trust for an email address based in part, on whether the email address is included in a sent directory. Mail server 106 may further determine yet another level of trust based on a variety of other conditions, including, but not limited to, whether the email address is associated with a message board frequented by the proposed email recipient, is associated with another predetermined site, and the like. Mail server 106 may also determine a level of trust based on whether a sender of a message includes a trusted address in a Carbon Copy (cc) header. In one embodiment, the sender of the message may also be considered as trusted. In another embodiment, another cc in the header may also be considered as trusted, based on the 'first' trusted cc address. Similarly, mail server 106 may determine a level of trust associated with an email address of a sender, where a recipient of the message selects to move the message into a valued folder (e.g., not a spam, bulk, trash, folder, or the like).

Mail server 106 may also include a spam detector, and the like, that is configured to determine if a received message is identifiable as a spam message.

AB 110 may include virtually any computing device capable of managing an address book associated with a message account. AB 110 may include databases, files, and the like, that are arranged to receive and store email addresses, and the like, within an address book. AB 110 may manage a plurality of address books, each address book being associated with at least one message account. For example, AB 110 may manage at least one address book for an end-user of device 102, and at least another address book for another end-user of RD 108. AB 110 may be configured to provide information associated with each address book to mail server 106. In one embodiment, AB 110 employs a linking mechanism to provide email address information, and the like, to mail server 106.

Devices that may operate as AB 110 include personal computers desktop computers, multiprocessor systems, microprocessor-based or programmable consumer electronics, network PCs, servers, and the like.

Although FIG. 1 illustrates mail server 106 and AB server 110 as distinct computing devices, the present invention is not so limited. For example, functionality of AB server 110 and mail server 106 may reside within the same computing device, or even be distributed across a plurality of computing devices, without departing from the scope or spirit of the present invention.

RD 108 may include virtually any computing device capable of receiving and sending a packet over a network, such as network 105, to and from another computing device, such as mail server 106, AB 110, and devices 102-104. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. RD 108 may also be any device that is capable of connecting using a wired or wireless communication medium such as a PDA, POCKET PC, wearable computer, and any other device that is equipped to communicate over a wired and/or wireless communication medium.

RD 108 may be configured to employ mail server 106 as its mail server. RD 108 may have an email address assigned to it, based on a variety of characteristics, including a domain name associated with its Internet Service Provider (ISP), mail server, and the like. RD 108 may further employ AB 110, in part, to store and manage at least one address book.

RD 108 may include a mail client application that is enabled to manage actions pertaining at least to its message inbox, address book, and the like. RD 108 may further employ mail server 106 to manage segmentation of its message inbox. The mail client may employ mail server 106 to examine each received message, determine a trust level associated with the received message, and direct the received message to an inbox segment based, in part, on the determined trust level.

Illustrative Server Environment

Figure 2:
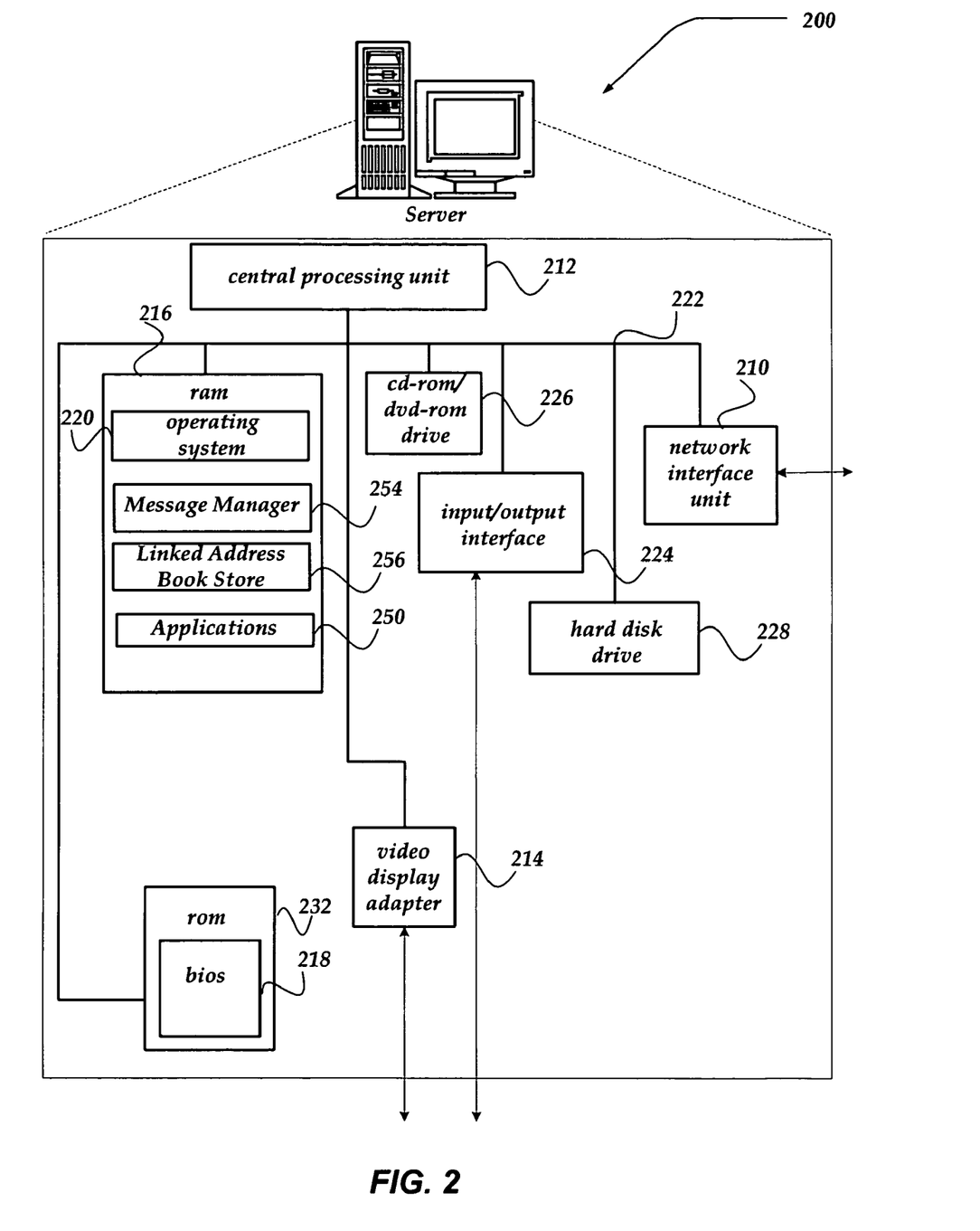
FIG. 2 shows one embodiment of a mail server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, contact database programs, word processing programs, spreadsheet programs, and so forth. Mass storage may further include applications such as a spam detector (not shown), message manager 254, linked address book store 256, and the like.

Message manager 254 is configured to perform actions that include, but are not limited to determining a trust level associated with a received message and forwarding the received message to a segmented inbox based, in part, on the determined trust level.

Message manager 254 may employ linked address book store 256, in part, to determine the trust level associated with the received message. Message manager 254 may determine one trust level, for example, based on whether an email address associated with the received message is also associated with the intended recipient's address book. Message manager 254 may further employ linked address book store 256 to determine a degrees of separation for the received message. The determined degrees of separation may be employed to determine another level of trust. For example, one message account could determine that an email address should be classified as untrusted, with a low level of trust, if the degrees of separation are greater than some predetermined value.

Message manager 254 may employ a variety of other mechanisms to determine a level of trust for the received message, including, but not limited to those described below in conjunction with FIG. 4.

Message manager 254 may employ the determined level of trust to direct the received message to a segment within an inbox. Segmentation of an inbox may be achieved using a variety of mechanisms, including, color coding the received message, associating a predetermined icon with the received message, associating an identifier, associating a label, parameter, and the like. In one embodiment, the segmentation mechanism may be employed to route the received message to a predetermined folder.

In one embodiment, message manger 254 is arranged to direct the received message to at least one of a trusted email address inbox segment, an untrusted email address inbox segment, and a bulk email address inbox segment. However, the invention is not so limited, and other inbox segmentations may be included, without departing from the scope of the invention.

Server 200 may also include an SMTP handler application to interface with message manager 254 for transmitting and receiving a message. Server 200 may also include an HTTP handler application for receiving and handing HTTP requests, and an HTTPS handler application for handling secure connections. The HTTPS handler application may initiate communication with an external application in a secure fashion.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 is utilized by server 200 to store, among other things, application programs, databases, and the like.

Generalized Operation

Figure 3:
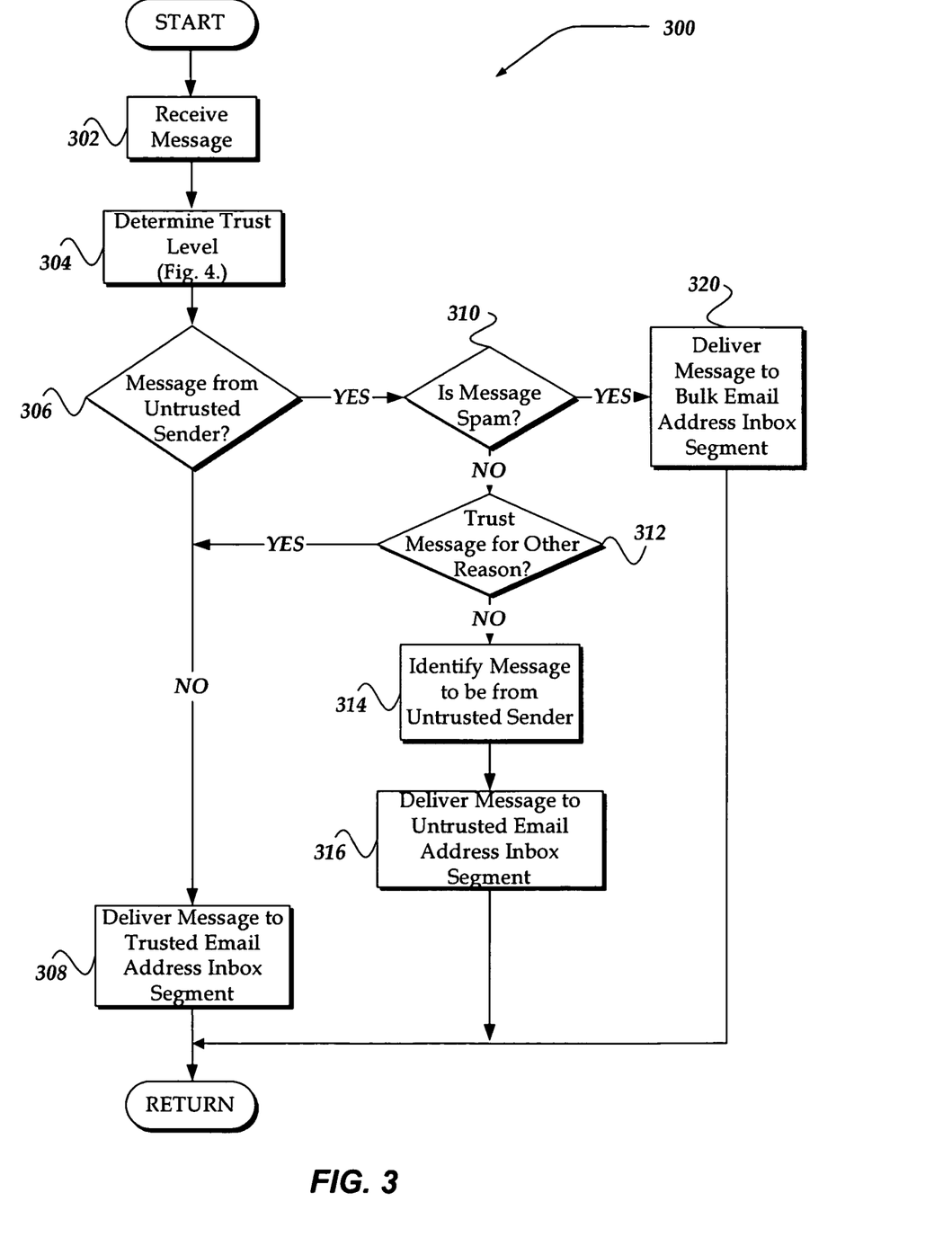
FIG. 3 illustrates a logical flow diagram generally showing one embodiment of a process for managing a message based on a segmented inbox.

The operation of certain aspects of the present invention will now be described with respect to FIGS. 3-4. FIG. 3 illustrates a logical flow diagram generally showing one embodiment of a process for managing a message based on a segmented inbox. Process 300 may be implemented in mail server 106 of FIG. 1.

Process 300 begins, after a start block, at block 302, where a message is received. Each received message may include at least one email address that is associated with an identified source of the message. This email address may be called the source email address, source EA, and the like. Moreover, each received message further includes at least one other email address associated with a destination of the message. This email address may be called the destination email address, destination EA, and the like.

Upon receipt of the message processing flows to block 304. Block 304 is described in more detail below in conjunction with FIG. 4. Briefly, however, a level of trust is determined for the received message, based in part on the source email address. In one embodiment, the level of trust is employed to identify the message as from a trusted email address or an untrusted email address. However, the present invention is not so limited, and varying mechanisms may be employed to weight a level of trust associated with the received message. For example, in one embodiment, if the received message is associated with an email address within one's address book, the level of trust may be weighted higher than if the received message is associated with an email address to which one sent a message. The weighting may be employed to determine which inbox segment the message will be directed.

Process 300 flows next to decision block 306 where a determination is made whether the received message is from an untrusted sender. That is, is the source email address determined to be an untrusted email address? If it is determined to be an untrusted email address, processing branches to decision block 310; otherwise, processing flows to block 308.

At block 308, the received message is delivered to the trusted email address inbox segment. Delivery to the trusted email address inbox segment may include identifying a color, an icon, or similar special designator, with the received message, such that the received message may be managed by the recipient. Upon completion of block 308, process 300 returns to a calling process to perform other actions.

At decision block 310, however, the received message from an untrusted email address is examined to determine whether it is a potential spam message. Spam detection may be determined based on any of a variety of mechanisms, including but not limited to, whether the destination email address in included within a larger set of destination email addresses, content of the message, including headers, a predetermined spam email address list, and the like. In any event, if is determined that the received message is potentially a spam message, processing flows to block 320. At block 320, a special bulk email address designator is associated with the received message. The special bulk email address designator may include a color coding, an icon, a sorting parameter, priority parameter, label, or the like, that enables the recipient to identify the received message as a bulk message. The recipient may then select to employ a filter, and the like, to delete such messages, direct them to a predetermined folder, and the like. In one embodiment, at block 320, the received message is directed to a bulk email address inbox segment. Upon completion of block 320, processing returns to the calling process to perform other actions.

At decision block 310, if is determined that the received message is not a potential spam message, processing flows to decision block 312, where a determination is made whether the message may be trusted for another reason. The message may be trusted for a variety of other reasons, including, but not limited to, whether the email address is associated with a message board frequented by the proposed email recipient, is associated with another predetermined site, and the like. The received message may also be trusted based on whether the sender includes a trusted address in a cc header. Similarly, the received message may be trusted where the proposed email recipient selects to move the message into a valued folder (e.g., not a spam, bulk, trash, folder, or the like). In any event, if the received message is trusted for another reason, processing flows to block 308; otherwise, processing flows to block 314.

At block 314, the message is identified to be from an untrusted sender (e.g., an untrusted email address). At block 314, a special untrusted sender designator is associated with the received message. The special untrusted sender designator may include any of a variety of designators, including, but not limited to a color code, an icon, a sort parameter, and the like. Process 300 then flows to block 316, where the received message is delivered to the inbox segment associated with untrusted email addresses. Processing then returns to the calling process to perform other actions.

Figure 4:
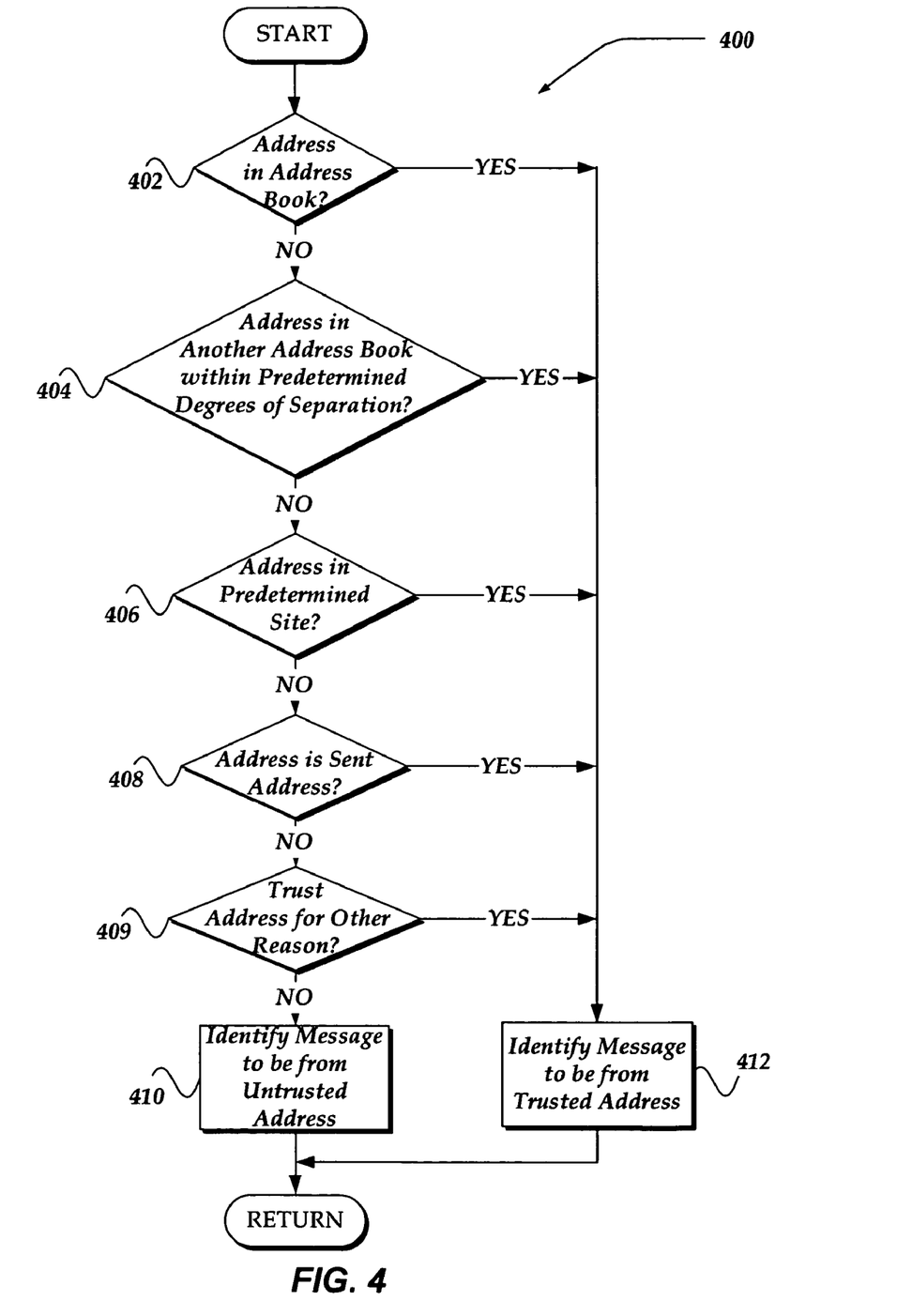
FIG. 4 illustrates a logical flow diagram generally showing one embodiment of a process for managing a received message, such as an email message, in accordance with the present invention.

FIG. 4 illustrates a logical flow diagram generally showing one embodiment of a process for managing a received message, in accordance with the present invention. In one embodiment, process 400 is implemented in mail server 106 of FIG. 1. Process 400 is typically called from block 302 of FIG. 3.

Process 400 begins, after a start block, at decision block 402, where a determination is made whether the source email address is included within the address book of the intended destination (e.g., intended recipient's address book). If it is determined that the source email address is not within the intended recipient's address book, process 400 flows to decision block 404.

However, if it is determined that the source email address is within the intended recipient's address book, process 400 flows to block 412, where the received message is identified to be from an trusted email address. Processing then returns to the calling process (process 300 of FIG. 3) to perform other actions.

At decision block 404, a determination is made whether the source email address is within another's address book within a predetermined degree of separation, as described elsewhere in this specification. If it is determined that the source email address is within the predetermined degree of separation, processing proceeds to block 412, where the received message is identified to be from a trusted email address. Processing then returns to the calling process (process 300 of FIG. 3) to perform other actions.

At decision block 404, if the source email address is not within the predetermined degree of separation, processing flows to decision block 406, where a determination is made whether the source email address is associated with a predetermined site. Predetermined sites may include, but are not limited to, a message board, such as a community message board, a NNTP server site, personals' board, a trusted organization, trusted business, and the like. If it is determined that the received message is from a predetermined site processing flows to block 412, where the received message is identified to be from a trusted email address. Processing then returns to the calling process (process 300 of FIG. 3) to perform other actions.

Alternatively, if at decision block 406, the received message is not from a predetermined site, processing flows to decision block 408, where a determination is made whether the source email address is associated with an email address to which the recipient sent a message. This may be determined employing a variety of mechanisms, including, but not limited to, saving email address information associated with each sent message, and the like. In any event, if it is determined that the source email address is associated with a sent email address, processing proceeds to block 412, where the received message is identified to be from a trusted email address. Processing then returns to the calling process (process 300 of FIG. 3) to perform other actions.

Alternatively, if at decision block 408, the source email address is not associated with an email address to which the recipient sent a message, processing flows to decision block 409. At decision block 409, a determination is made whether the source email address is trustable for some other reason. The source email address may be trusted for a variety of other reasons, including, but not limited to, whether the source email address is associated with a message board frequented by the intended email recipient, is associated with another predetermined site, and the like. The source email address may also be trusted based on whether email message includes a trusted address in the cc header, and the like. In any event, if the source email address is trusted for another reason, processing flows to block 412; otherwise, processing flows to block 410.

At block 410, the received message is identified to be from an untrusted email address (e.g., not sufficiently trusted). Upon completion of block 410 processing returns to the calling process (process 300 of FIG. 3) to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method of managing a message over a network, comprising:
   receiving the message including a source email address associated with the message;
   determining that the message is from a trusted source email address, if the source email address is in an address book of an intended recipient or an address book of another within a predetermined degrees of separation from the intended recipient;
   determining that the message is from a trusted source email address, if the source email address is associated with an email address to which the intended recipient sent a message, and is not in the intended recipient's address book or an address book of another within the predetermined degrees of separation from the intended recipient;
   if the message is from an untrusted source email address, determining the trust level as untrusted;
   if the message is from a trusted source email address determining the trust level as trusted; and
   delivering the received message to an inbox segment based, in part, on the determined trust level.

2. The method of claim 1, wherein the trust level is further based on the source email address being associated with a predetermined site.

3. The method of claim 1, wherein the inbox segment further comprises segmentation of an email inbox based on at least one of a color parameter, an icon, a folder, and a label.

4. The method of claim 1, further comprising:
if the source email address is associated with a message board frequented by the intended recipient, determining that the message is from a trusted source email address, wherein the address of the message board is not in the intended recipient's address book or an address book of another within the predetermined degrees of separation from the intended recipient.

5. The method of claim 1, further comprising:
if the received message is from an untrusted source email address, determining if the message is a spam message.

6. The method of claim 1, wherein the inbox segment further comprises at least one of a trusted email address segment, an untrusted email address segment, and a bulk email address segment.

7. The method of claim 1, wherein the method is operable on a mobile computing device.

8. A client adapted to managing a message over a network, the client being configured to perform actions, comprising:
receiving a message that is delivered to an inbox segment based on whether the message is from a trusted or untrusted source email address, wherein:
the message is from a trusted source email address, if the source email address is in an address book of an intended recipient or an address book of another within a predetermined degrees of separation from the intended recipient;
the message is further determined to be from a trusted source email address, if the source email address is associated with an email address to which the intended recipient sent a message, and is not in the intended recipient's address book or an address book of another within the predetermined degrees of separation from the intended recipient; and sorting the message and another message based on the inbox segment.

9. The client of claim 8, wherein the inbox segment further comprises a segmentation of an email inbox based on at least one of a color parameter, an icon, a folder, a sort parameter, and a label.

10. The client of claim 8, wherein the inbox segment further comprises at least one of a trusted email address segment, an untrusted email address segment, and a bulk email address segment.

11. A server for managing a message over a network, comprising:
a transceiver for receiving and sending messages to a computing device; and
a transcoder that is configured to perform actions, including:
receiving the message including a source email address;
if the source email address is in an address book of an intended recipient or an address book of another within a predetermined degrees of separation from the intended recipient, then determining a trust level for the message as trusted;
if the source email address is associated with an email address to which the intended recipient sent a message, and is not in the intended recipient's address book or an address book of another within the predetermined degrees of separation from the intended recipient, then determining that the trust level for the message as trusted; and
if the source email address is associated with an untrusted email address, then determining that the trust level for the message is untrusted;
associating at least one special designator with the received message based, in part, on the determined trust level; and
delivering the message to an inbox segment based, in part, on the at least one associated special designator.

12. The server of claim 11, wherein the trust level is further determined based on if the source email address is associated with a predetermined site.

13. The server of claim 11, wherein the inbox segment further comprises segmentation of an email inbox based on the at least one associated special designator.

14. The server of claim 11, wherein the at least one special designator further comprises at least one of a color, an icon, a folder, a label, and a priority parameter.

15. The server of claim 11, wherein determining the trust level further comprises if the received message is from an untrusted email address, determining if the message is identifiable as a spam message.

16. The server of claim 11, wherein the inbox segment further comprises at least one of a trusted email address segment, an untrusted email address segment, and a bulk email address segment.

17. The server of claim 11, wherein delivering the message further comprises delivering the received message to a mobile computing device.

18. A computer-readable storage medium having computer instructions stored thereon for managing a message over a network, the computer instructions when executed on a computer cause the computer to perform the actions of:
receiving the message, wherein the message comprises a source email address;
enabling a determination of a trust level associated with the source email address, wherein the trust level, is based, in part, on:
if the source email address is in an address book of an intended recipient or an address book of another within a predetermined degrees of separation from the intended recipient, then setting the trust level as trusted;
if the source email address is associated with an email address to which the intended recipient sent a message, and is not in the intended recipient's address book or an address book of another within the predetermined degrees of separation from the intended recipient, then setting the trust level as trusted;
if the source email address is untrusted, then setting the trust level as untrusted; and
delivering the received message to an inbox segment based, in part, on the determined trust level.

19. The computer-readable storage medium of claim 18, wherein the trust level is further based on whether the message is from a trusted or an untrusted predetermined site.

20. The computer-readable storage medium of claim 18, wherein the inbox segment further comprises a segmentation of an email inbox based on at least one of a color parameter, an icon, a folder, and a label.

21. A system for managing a message over a network comprising:
a server that is configured to perform actions, comprising:
receiving the message, wherein a source email address is associated with the received message;
if the source email address is in an address book of an intended recipient or an address book of another within a predetermined degrees of separation from the intended recipient, then determining a trust level of the message as trusted;
if the source email address is associated with an email address to which the intended recipient sent a message, and is not in the intended recipient's address book or an address book of another within the predetermined degrees of separation from the intended recipient, then determining the trust level of the message as trusted;

if the source email address is determined to be untrusted, then determining that the trust level of the message as untrusted; and forwarding the received message; and a client computing device that is configured to perform actions, comprising:

receiving the forwarded message in an inbox segment based, in part, on the determined trust level.

* * * * *

UNITED STATES PATENT AND TRADEMARK OFFICE
CERTIFICATE OF CORRECTION

PATENT NO. : 7,428,579 B2 Page 1 of 1
APPLICATION NO. : 10/856007
DATED : September 23, 2008
INVENTOR(S) : Miles A. Libbey, IV et al.

It is certified that error appears in the above-identified patent and that said Letters Patent is hereby corrected as shown below:

In column 2, line 13, delete ""on." 0" and insert -- "on." --, therefor.

In column 12, line 33, in Claim 18, delete "level," and insert -- level --, therefor.

Signed and Sealed this

Thirtieth Day of December, 2008

JON W. DUDAS
*Director of the United States Patent and Trademark Office*